April 5, 1927. Re. 16,583

H. O. WIEMANN

LICENSE INDICATOR

Original Filed April 20, 1920

Herbert O. Wiemann Inventor

By H. S. Amstutz

Attorney

Reissued Apr. 5, 1927. Re. 16,583

UNITED STATES PATENT OFFICE.

HERBERT O. WIEMANN, OF CHESTERTON, INDIANA.

LICENSE INDICATOR.

Original No. 1,378,640, dated May 17, 1921, Serial No. 375,314, filed April 20, 1920. Application for reissue filed April 27, 1922. Serial No. 557,009.

This invention relates to license indicators for motor cars and like vehicles and its object is to provide an indicator which renders the license number clearly legible at a considerable distance by night or by day.

Another object of the invention is to embody in the indicator a tail-light element as a substitute for the usual tail lamp.

With these and other ends in view, I illustrate in the accompanying drawing such instances of adaptation as will disclose the broad underlying features without limiting myself to the specific details shown thereon or described herein.

Figure 1:
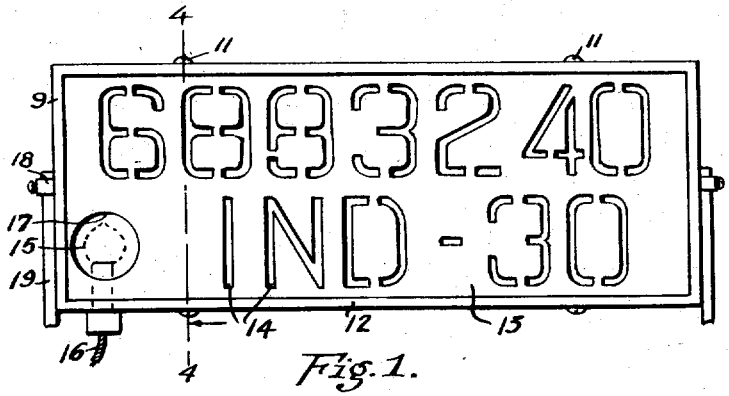
Figure 1 is an elevation of the indicator, as viewed from the rear of the vehicle.
Figure 2:
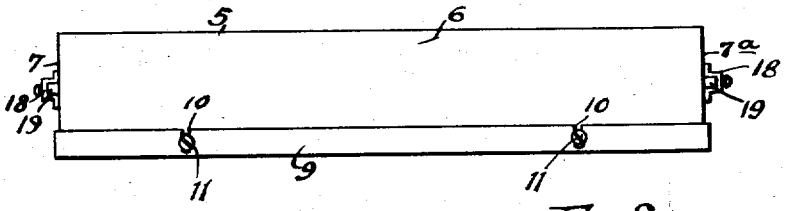
Fig. 2 is a plan view.
Figure 4:
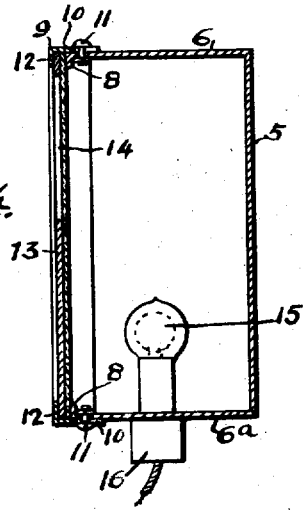
Fig. 4 is a section on the line 4—4 of Fig. 1.
Figure 3:
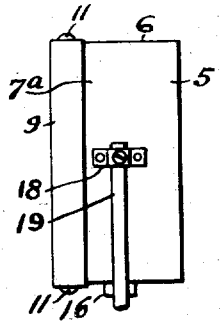
Fig. 3 is an end view.

Referring specifically to the drawing, the indicator is in the form of an elongated metal casing 5, having top and bottom walls 6 and 6ª, and end walls 7 and 7ª. The front of the casing is open, and its marginal edge is turned in flatly to reinforce the stock, some portions, such as 8, being however allowed to project into the plane of the opening.

Over the open side of the casing is adapted to be fitted a frame 9, whose top and bottom sections are cut with slots 10 to fit beneath the heads 11 of screws passed into the walls 6 and 6ª, the tightening of the screws serving to fasten the frame to the casing. The front edge 12 of the frame is narrow, and of a width corresponding with the height of the casing portions 8.

Immediately behind the frame 9 is positioned a sheet metal unitary plate 13 painted a dark color and stenciled with the license number; and next behind the plate 9 is a plate 14 of glass. The bottom of the casing is fitted near one end thereof with an electric lamp 15, which has suitable connections 16 for receiving current from a battery or generator carried by the vehicle. The slots 10 or any equivalent thereof permit the frame 9 to be adjusted to the thickness of the plates, so that they may be held fast with casing portions 8 as a backing.

The stencil plate 13 has a cut-out portion 17 opposite the lamp 15, and that part of the glass plate 14 which is disclosed thereat is colored red. The balance of the plate 14 may be of opal glass, or painted white, or formed in any other color.

It will be seen that the present indicator serves both as a license plate and a tail light. During the day, when the lamp is not in use, the license number will stand out clearly against the contrasting background of the plate 13; and at night the effect will be intensified by the light from within the same also shining strongly through the red-tinted portion of the glass, which thus serves as a tail light. The device is of simple construction, and could be manufactured economically.

The end walls 7 and 7ª of the casing are made with ears 18 for supporting brackets 19 extending from the body of the vehicle, or may be readily adapted to any other style of connections that may be considered suitable.

What I claim is:

1. A license indicator comprising a casing having an open front, a frame fitted over the latter and composed of top bottom and side sections, the casing and frame having adjacently placed openings in opposite walls positioned in pairs of an approximately round and an elongated shape, a stenciled license plate within the frame, a translucent plate behind the license plate, backing abutments for the latter, and fastening means operable in the openings for holding the frame assembled on the casing so as to be adjustable to the thickness of the license and translucent plates.

2. A license indicator comprising a casing having an open front. a frame fitted over the latter and composed of top bottom and side portions the casing and frame having registering cooperating openings which openings in the frame are of different shapes from the openings in the casing, a license plate, a translucent plate behind the license plate, backing abutments for the former, and means operable in the aforesaid openings for holding the casing and frame in engagement with each other so as to be adjustable to a varying thickness of the license and translucent plates.

3. A license indicator comprising a casing having an open front, a frame fitted over the latter and composed of top, bottom and side sections, a stenciled license plate within the frame, a translucent plate behind the license plate, backing abutments for the latter, and screws entering opposite walls of the casing, corresponding walls of the frame having slots through which the screws pass, said slots running in a direction transverse of the casing and rendering the frame adjustable to the thickness of the license and translucent plates.

In testimony whereof I affix my signature.

HERBERT O. WIEMANN.